United States Patent
Kitamura et al.

(10) Patent No.: US 10,504,551 B1
(45) Date of Patent: Dec. 10, 2019

(54) MAGNETIC DISK DEVICE AND DATA PROCESSING METHOD OF MAGNETIC DISK DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventors: Shigeto Kitamura, Yokohama Kanagawa (JP); Kenji Yoshida, Kamakura Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 16/266,142

(22) Filed: Feb. 4, 2019

(30) Foreign Application Priority Data

Sep. 5, 2018 (JP) .................................. 2018-165854

(51) Int. Cl.
  G11B 27/36 (2006.01)
  G11B 5/54 (2006.01)
  G11B 20/12 (2006.01)
  G11B 5/012 (2006.01)

(52) U.S. Cl.
  CPC .......... *G11B 20/1217* (2013.01); *G11B 5/012* (2013.01); *G11B 2020/1265* (2013.01)

(58) Field of Classification Search
  CPC ...... G11B 5/00; G11B 20/10009; G11B 27/36; G11B 5/09; G11B 20/10; G11B 5/54; G11B 5/59633; G11B 5/59638
  USPC .................................. 360/25, 31, 39, 55, 75
  See application file for complete search history.

(56) References Cited

U.S. PATENT DOCUMENTS

| 5,223,993 | A | 6/1993 | Squires et al. |
| 6,519,109 | B1 | 2/2003 | Price et al. |
| 9,792,938 | B1 | 10/2017 | Kobayashi et al. |
| 2009/0002863 | A1* | 1/2009 | Feldman .................. G11B 5/09 360/48 |

* cited by examiner

*Primary Examiner* — Nabil Z Hindi
(74) *Attorney, Agent, or Firm* — White & Case LLP

(57) ABSTRACT

According to one embodiment, a magnetic disk device includes a first controller and a second controller. The first controller includes a first communication circuits and a first buffer and configured to control a first actuator, and the second controller includes a second communication circuit and a second buffer and configured to control a second actuator. The first controller is configured to receive the data from outside by the first buffer and configured to be able to communicate with the second controller through the first and the second communication circuit.

11 Claims, 4 Drawing Sheets

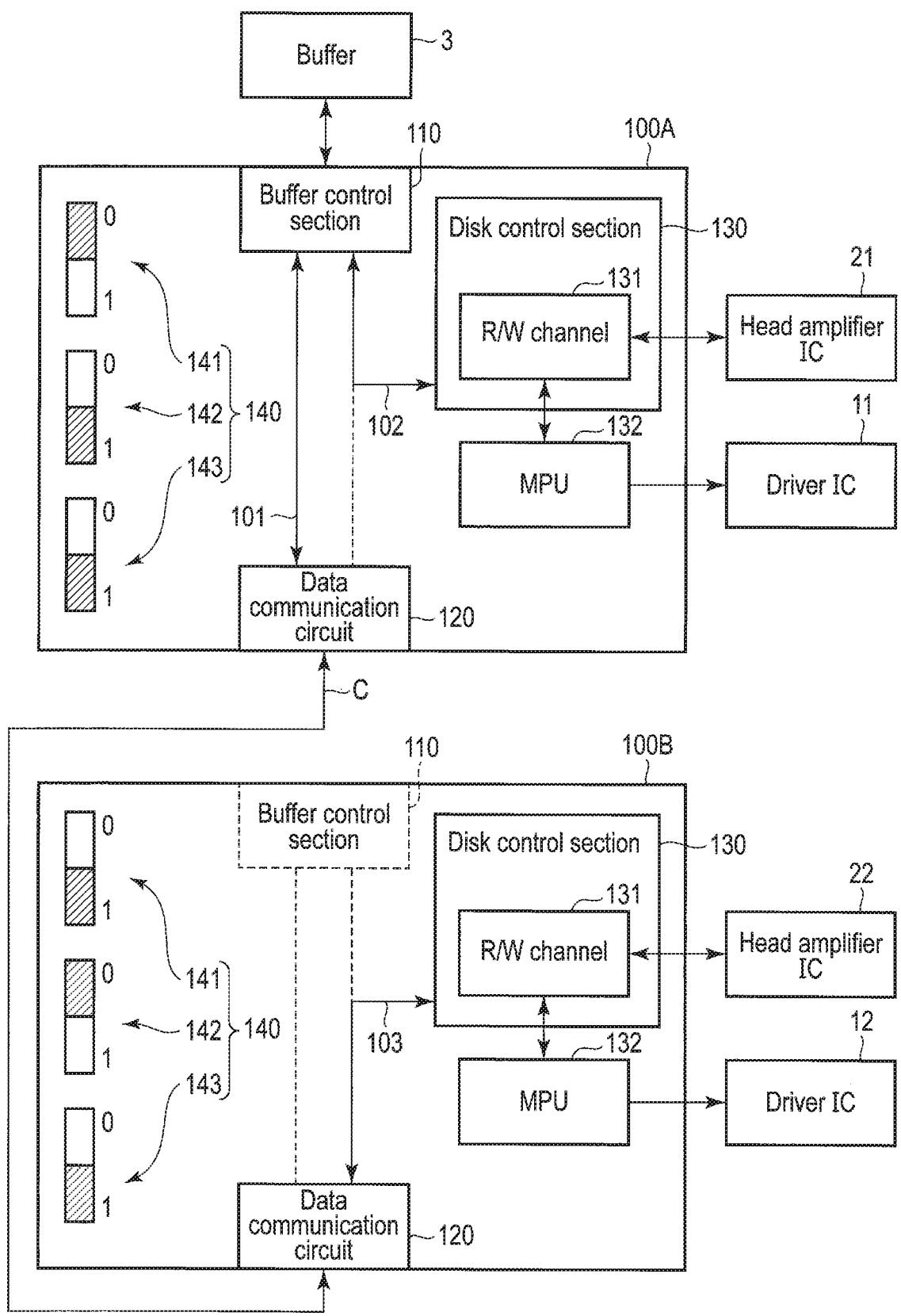
F I G. 2

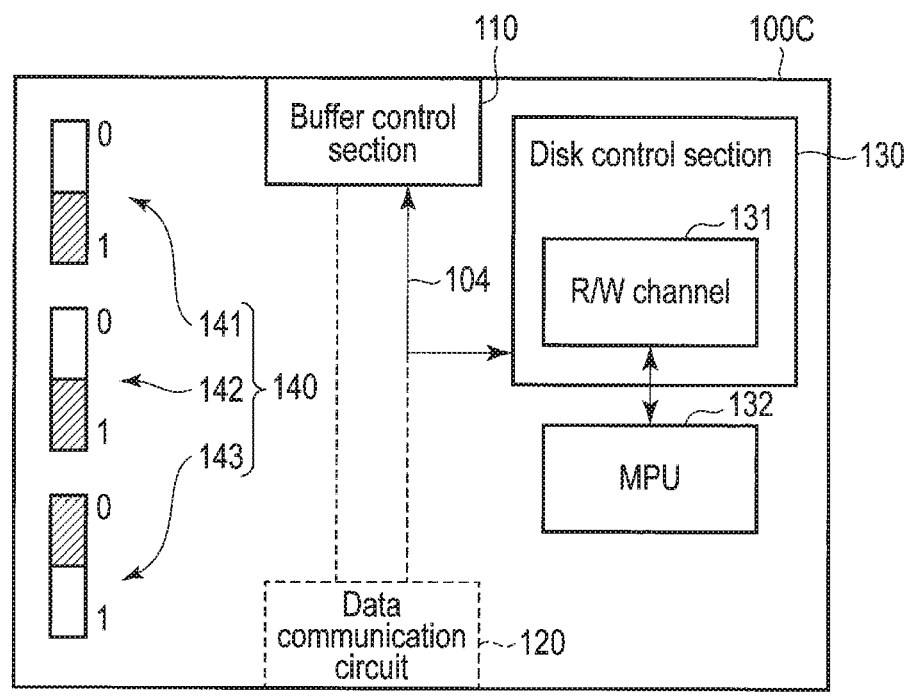
F I G. 5
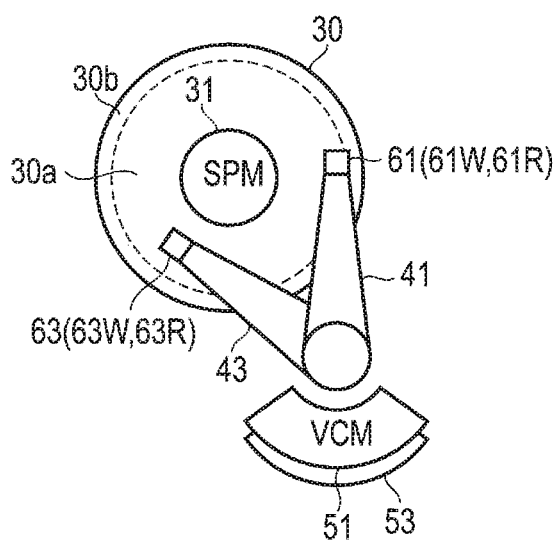
F I G. 6

MAGNETIC DISK DEVICE AND DATA PROCESSING METHOD OF MAGNETIC DISK DEVICE

CROSS-REFERENCE TO RELATED APPLICATIONS

This application is based upon and claims the benefit of priority from Japanese Patent Application No. 2018-165854, filed Sep. 5, 2018, the entire contents of which are incorporated herein by reference.

FIELD

Embodiments described herein relate generally to a magnetic disk device and data processing method of the magnetic disk device.

BACKGROUND

In the technical field of the magnetic disk device, a system provided with a control device including two actuators each configured to write data to a magnetic disk or read data from the magnetic disk, and configured to control the two actuators is proposed.

Regarding a conventional magnetic device, only one actuator is included therein, and hence it is sufficient if one control device is provided, however, in the case of a magnetic disk device provided with a plurality of actuators, there is a need to provide control devices each of which is configured to control each of the actuators.

As described above, there are magnetic disk devices of different types, and hence, regarding the specifications of the magnetic disk device, it is desirable that both of a one-actuator-enabled control device of a magnetic disk device and two-actuator-enabled control device of a magnetic disk device be commercialized. However, commercializing both the control devices implies manufacturing the two types of control devices and hence brings about high cost. Here, it is conceivable that cost reduction will be achieved by appropriating a control device for a magnetic disk device provided with two actuators for a control device of a magnetic disk device provided with one actuator. However, when this method is employed, about half the one control device is not used and hence considerable futility is caused. The price and electric power consumption of a control device are liable to increase in proportion to the area thereof, and hence when there is such futility, high cost of a one-actuator-enabled control device of a magnetic disk device is brought about.

Embodiments described herein aim to reduce cost of a control device of a magnetic disk device.

BRIEF DESCRIPTION OF THE DRAWINGS

FIG. 2 is a view showing an example of a schematic configuration of a control device according to the embodiment.

FIG. 5 is a view showing an example of setting of a case where a control section according to the embodiment is applied to a magnetic disk device of a single actuator.

FIG. 6 is a view showing an example of a magnetic disk device of a dual actuator according to another embodiment.

DETAILED DESCRIPTION

Figure 1:
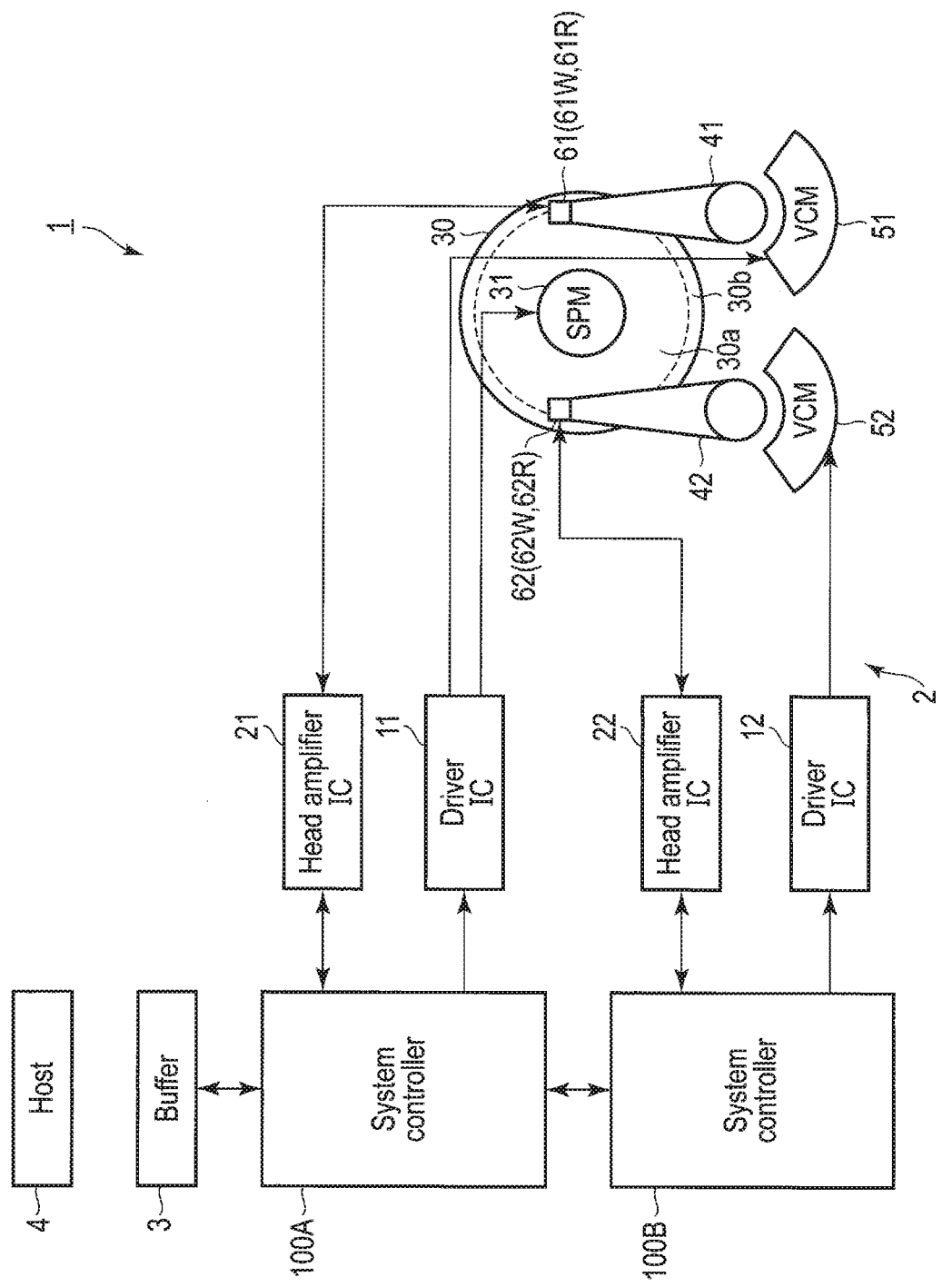
FIG. 1 is a view showing an example of a schematic configuration of a magnetic disk device according to an embodiment.

In general, according to one embodiment, a magnetic disk device includes a magnetic disk, first actuator, second actuator, first controller, and second controller. The first actuator executes write/read of first data on/from the magnetic disk device. The second actuator executes write/read of second data on/from the magnetic disk device. The first controller includes a first communication circuit and a first buffer and controls the first actuator. The second controller includes a second communication circuit and a second buffer and controls the second actuator. Furthermore, the first controller is configured to receive the data from outside by the first buffer and configured to be able to communicate with the second controller through the first communication circuit and the second communication circuit.

Hereinafter, embodiments will be described with reference to the accompanying drawings. It should be noted that the disclosure has been presented by way of example only, and the contents described in the following embodiments are not intended to limit the scope of the invention. Modifications readily occur to those skilled in the art are naturally included in the scope of the disclosure. In order to make the description more definite, the size, shape, and the like of each section are schematically expressed in the drawings by changing them from the actual embodiment in some cases. In a plurality of drawings, corresponding elements are denoted by identical reference symbols, and detailed descriptions are omitted in some cases.

FIG. 1 is a view showing an example of a schematic configuration of a magnetic disk device 1 according to an embodiment. The magnetic disk device 1 will be described below in connection with a case where the device 1 is provided with a dual actuator as a plurality of actuators.

The magnetic disk device 1 is provided with a head/disk assembly (HDA) 2, driver ICs 11 and 12, head amplifier integrated circuits (hereinafter referred to as head amplifier ICs) 21 and 22, buffer (buffer memory) 3, system controller (first controller) 100A, and system controller (second controller) 100B both of which are one-chip integrated circuits. For example, the system controller 100A and the system controller 100B may use the same model number. As a result, the development cost of the system controller can be suppressed. Further, the magnetic disk device 1 is connected to a host 4 in such a manner as to be able to communicate with the host 4. Furthermore, the magnetic disk device 1 is also provided with a nonvolatile memory (illustration omitted) which is a semiconductor memory configured to retain data stored therein even when electric power supplied thereto is cut off. This nonvolatile memory stores therein, for example, data or the like to be used when the magnetic disk device 1 executes various processing operations.

The HDA 2 includes a magnetic disk (hereinafter referred to as a "disk") 30, spindle motor (SPM) 31, arm 41 on which a head 61 is mounted, arm 42 on which a head 62 is mounted, and voice coil motors (VCMs) 51 and 52. The disk 30 is rotated by the spindle motor 31. The arm 41 and VCM 51 constitute an actuator (first actuator). This actuator controls movement of the head 61 mounted on the arm 41 to a target position on the disk 30 by the drive of the VCM 51. Likewise, the arm 42 and VCM 52 constitute an actuator (second actuator). This actuator controls movement of the head 62 mounted on the arm 42 to a target position on the disk 30 by the drive of the VCM 52.

On the disk 30, a recording area 30a which the user can utilize and system area 30b to which information necessary for system management is to be written are allocated to a recording area thereof.

The head 61 has a slider as a main body, and is provided with a write head 61W and read head 61R which are mounted on the slider. The write head 61W writes data on the disk 30. The read head 61R reads data recorded on the data track of the disk 30. The head 61 writes data on the disk 30 in units of blocks each including at least one sector, and reads data from the disk 30 in units of blocks. Likewise, the head 62 has a slider as a main body, and is provided with a write head 62W and read head 62R which are mounted on the slider. The write head 62W writes data on the disk 30. The read head 62R reads data recorded on the data track of the disk 30. The head 62 writes data on the disk 30 in units of blocks each including at least one sector, and reads data from the disk 30 in units of blocks. Here, the sector is data of the minimum unit to be written on the disk 30 or to be read from the disk 30.

The driver IC 11 controls drive of the SPM 31 and VCM 51 in accordance with the control of the system controller 100A (more specifically, an MPU 132 to be described later). Further, the driver IC 12 controls drive of the VCM 52 in accordance with the control of the system controller 100B (more specifically, the MPU 132 to be described later).

The head amplifier IC 21 is provided with a read amplifier and write driver. The read amplifier amplifies a read signal read from the disk 30 and outputs the amplified read signal to the system controller 100A (more specifically, a read/write (R/W) channel 131 to be described later). The write driver outputs a write current corresponding to write data to be output from the R/W channel 131 to the head 61. Likewise, the head amplifier IC 22 is provided with a read amplifier and write driver. The read amplifier amplifies a read signal read from the disk 30 and outputs the amplified read signal to the system controller 100B (more specifically, the read/write (R/W) channel 131 to be described later). The write driver outputs a write current corresponding to write data to be output from the R/W channel 131 to the head 62.

The buffer 3 is a semiconductor memory configured to temporarily record therein data or the like to be transmitted to/from the magnetic disk device 1 from/to the host 4. It should be noted that the buffer 3 may also be formed integral with the aforementioned nonvolatile memory. The buffer 3 is, for example, a DRAM, Static Random Access Memory (SRAM), SDRAM, Ferroelectric Random Access Memory (FeRAM), Magnetoresistive Random Access Memory (MRAM) or the like.

The system controllers 100A and 100B are each realized by using a large-scale integrated circuit (LSI) called a System-on-a-Chip (SoC) formed by integrating a plurality of elements onto a single chip. Further, each of the system controller 100A and system controller 100B has the identical configuration as shown in FIG. 2.

FIG. 2 is a view showing an example of a schematic configuration of each of the system controllers 100A and 100B. As shown in FIG. 2, the system controller 100A includes an MPU 132, buffer control section 110, data communication circuit (first communication circuit) 120, disk control section 130, and mode setting section 140, and the system controller 100B includes an MPU 132, buffer control section 110, data communication circuit 120, disk control section 130, and mode setting section 140, and hence each of the system controllers 100A and 100B has the identical configuration. It should be noted that each of the disk control sections 130 of the system controllers 100A and 100B includes an R/W channel 131.

The system controller 100A is connected to the driver IC 11, head amplifier IC 21, buffer 3, and system controller 100B. The system controller 100B is connected to the driver IC 12, head amplifier IC 22, and system controller 100A. The system controller 100A and system controller 100B are connected to each other through a communication path C. Here, the communication path C is a communication path through which data can be transferred at high speed.

Here, the mode setting section 140 will be described below. The mode setting section 140 is a setting section configured to set an operation mode of each of the system controllers 100A and 100B. More specifically, the mode setting section 140 is constituted of a first operation mode setting section 141, second operation mode setting section 142, and third operation mode setting section 143. Each of the first, second, and third mode setting sections 141 142, and 143 is configured to be able to set a mode to ON/OFF, and is configured to be able to set one of the operation modes. The mode setting section 140 is connected to an external terminal of each of the system controllers 100A and 100B and, when 0 or 1 of the external terminal is set by the operator, it becomes possible to operate the system controller in the set operation mode. It should be noted that the mode setting section 140 shown in FIG. 2 is an example, and the mode setting section 140 is not limited to this. For example, a mode setting section may be configured in such a manner as to be able to set a mode by means of two external terminals, or an area for setting an operation mode may be provided in a predetermined area in each of the system controllers 100A and 100B, and an operation mode may be determined on the basis of the setting of the area. Determination of the operation mode in this case is made, for example, at the time of manufacture of the magnetic disk device 1.

Next, the first, second, and third operation modes will be described below. When the first operation mode section 141 is in the on-state, the system controller operates in a first operation mode. The first operation mode is a mode of a case where the system controller operates as a main control device of a dual actuator. More specifically, the buffer control section 110 and data communication circuit 120 become able to communicate with each other by means of a communication path 101, and the buffer control section 110 and disk control section 130 become able to communicate with each other by means of a communication path 102 (reference: system controller 100A of FIG. 2).

When the second operation mode section 142 is in the on-state, the system controller operates in a second operation mode. The second operation mode is a mode of a case where the system controller operates as a sub-control device of the dual actuator. More specifically, whereas the data communication circuit 120 and disk control section 130 become able to communicate with each other by means of a communication path 103, the function of the buffer control section 110 becomes disabled (reference: system controller 100B of FIG. 2). When the second operation mode setting section 142 is set as described above, the function unnecessary in the second operation mode is disabled.

Finally, when the third operation mode setting section 143 is in the on-state, the system controller operates in a third operation mode. The third operation mode is a mode of a case where the system controller operates as a control device of a single actuator. More specifically, whereas the buffer control section 110 and disk control section 130 become able to communicate with each other by means of a communication path 104, the function of the data communication circuit 120 is disabled (reference: system controller 100C of FIG. 5).

As described above, the system controller is configured to be able to operate in the three operation modes (100A, 100B, and 100C) according to the setting of the mode setting section 140. In FIG. 2, the system controller 100A is a control device functioning as the main control device of the dual actuator, and hence setting is made in such a manner that the first operation mode setting section 141 is brought into the on-state (setting of "1"), and the system controller 100A operates in the first operation mode.

Next, each of the buffer control section 110, data communication circuit 120, and disk control section 130 all of which are included in the system controller 100A will be described below.

The buffer control section 110 controls delivery of data to/from the buffer 3 from/to the system controller 100. Upon receipt of a write command (write data) from the host 4, the system controller 100A stores the write data in the buffer 3 through the buffer control section 110. The MPU 132 of the system controller 100A separates the write data into first data and second data other than the first data, and notifies the MPU 132 of the system controller 100B of information about the second data through the communication path C. The MPU 132 of the system controller 100A writes the first data on the disk 30 through the buffer control section 110 of the system controller 100A, disk control section 130, and head amplifier IC 21, and the MPU 132 of the system controller 100B writes the second data on the disk 30 through the buffer control section 110 of the system controller 100A, data communication circuit 120, communication path C, data communication circuit 120 of the system controller 100B, disk control section 130, and head amplifier IC 22. Further, upon receipt of a read command from the host 4, the system controller 100A separates the read data which is an object to be read into first data and second data other than the first data on the basis of an instruction of the MPU 132, and notifies the MPU 132 of the system controller 100B of information about the second data through the communication path C. The MPU 132 of the system controller 100A stores the first data in the buffer 3 through the head amplifier IC 21, disk control section 130 of the system controller 100A, and buffer control section 110. The MPU 132 of the system controller 100B stores the second data in the buffer 3 through the head amplifier IC 22, disk control section 130 of the system controller 100B, data communication circuit 120, communication path C, data communication circuit 120 of the system controller 100A, and buffer control section 110. The MPU 132 of the system controller 100A carries out control in such a manner as to transmit the first data and second data stored in the buffer 3 to the host 4.

The data communication circuit 120 of the system controller 100A is connected to the data communication circuit 120 of the system controller 100B through the communication path C, and controls transmission/reception of data to be carried out between the system controller 100A and system controller 100B.

The disk control section 130 includes the R/W channel 131.

The R/W channel 131 executes signal processing of the read data and write data in response to an instruction from the MPU 132. Hereinafter, the read data and write data will be simply called data in some cases. The R/W channel 131 includes a circuit or function configured to measure the signal quality of the read data. The R/W channel 131 includes, for example, a function or the like of executing Error Checking and Correcting (ECC) to which the read data read from the disk 30 is to be subjected. The R/W channel 131 is connected to the head amplifier IC 21 and MPU 132.

The MPU 132 is a main controller configured to control each section of the magnetic disk device 1. The MPU 132 controls the rotational speed of the SPM 31 through the driver IC 11, controls the VCM 51, and executes servo control of carrying out positioning of the head 61. Further, the MPU 132 controls an operation of writing data on the disk 30, and selects a storage destination of write data transferred from the host 4. The MPU 132 executes processing on the basis of firmware. The MPU 132 is connected to the R/W channel 131.

Furthermore, upon receipt of a write command, the MPU 132 separates the write data into first data and second data other than the first data, and issues (transmits) an instruction to transmit the first data to the disk control section 130 of the system controller 100A, and transmit the second data to the disk control section 130 of the system controller 100B to the buffer control section 110. Further, upon receipt of a read command, the MPU 132 separates the read data which is an object to be read into first data and second data other than the first data, and transmits an instruction to read the first data from the disk control section 130 of the system controller 100A, and read the second data from the disk control section 130 of the system controller 100B to the buffer control section 110. Here, as the condition for separating the read data into the first data and second data, for example, the read data may be separated in units of tracks for reading/writing data or may be separated into data to be processed in the main processing and data to be processed in the background processing.

Next, the system controller 100B will be described below. The system controller 100B has a configuration identical to the system controller 100A but differs from the system controller 100A in that the second operation mode setting section 142 is in the on-state (setting of "1"). Accordingly, the system controller 100B operates in the second operation mode. The system controller 100B operates in the second operation mode, and hence, as described previously, the data communication circuit (second communication circuit) 120 and disk control section 130 are enabled to communicate with each other through the communication path 103, and the function of the buffer control section 110 is disabled.

The disk control section 130 of the system controller 100B includes the R/W channel 131 and MPU 132. A description of the function of controlling the head amplifier IC 22 to write data on the disk 30 and read data from the disk 30, the function being possessed by the R/W channel 131 is identical to the case of the R/W channel 131 of the system controller 100A. Further, a description of the function of controlling the R/W channel 131 and controlling drive of the driver IC 12 to carry out positioning of the head 62, the function being possessed by the MPU 132 is identical to the case of the system controller 100A.

As described above, although each of the system controller 100A and system controller 100B has the identical configuration, according to the setting of the mode setting section 140, the system controller 100A operates in the first operation mode and hence functions as a main control device of the dual actuator, and system controller 100B operates in the second operation mode and hence functions as a sub-control device of the dual actuator.

Figure 3:
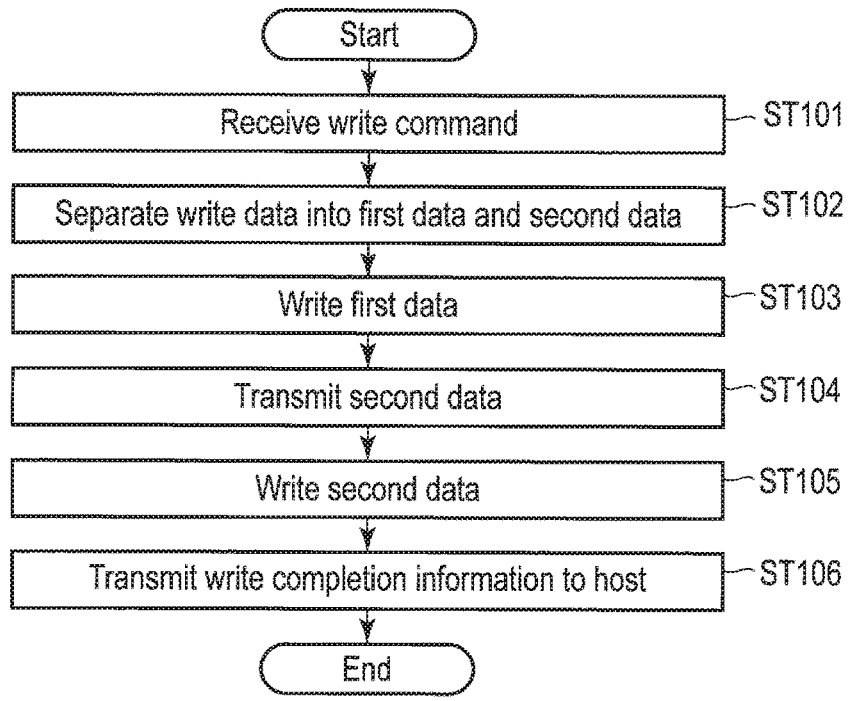
FIG. 3 is a flowchart showing an example of a write operation of the magnetic disk device according to the embodiment.

Next, a write operation of the magnetic disk device 1 configured in the manner described above will be described below. FIG. 3 is a flowchart showing an example of a write operation of the magnetic disk device.

As shown in FIG. 3, upon receipt of a write command from the host 4 (ST101), the magnetic disk device 1 separates the write data stored in the buffer 3 into the first data and second data (ST102). More specifically, the MPU 132 carries out control of separating the write data into the first data to be written on the disk 30 by using the head 61 and second data other than the first data and to be written on the disk 30 by using the head 62, and transmits information about a result of the data separation to the buffer control section 110. Further, the first data is transmitted from the buffer control section 110 to the disk control section 130 through the communication path 102, and hence the disk control section 130 writes the first data on the disk 30 by using the head 61 (ST103).

Further, the second data is transmitted from the buffer control section 110 to the disk control section 130 through the communication path 101, data communication circuit 120, communication path C, data communication circuit 120 of the system controller 100B, and communication path 103 (ST104). The disk control section 130 of the system controller 100B uses the head 62 to write the second data on the disk 30 (ST105). When the write is completed, information about the write completion is transmitted from the magnetic disk device 1 to the host 4 (ST106), and the processing is terminated. In this way, the write processing is executed in the magnetic disk device 1.

Figure 4:
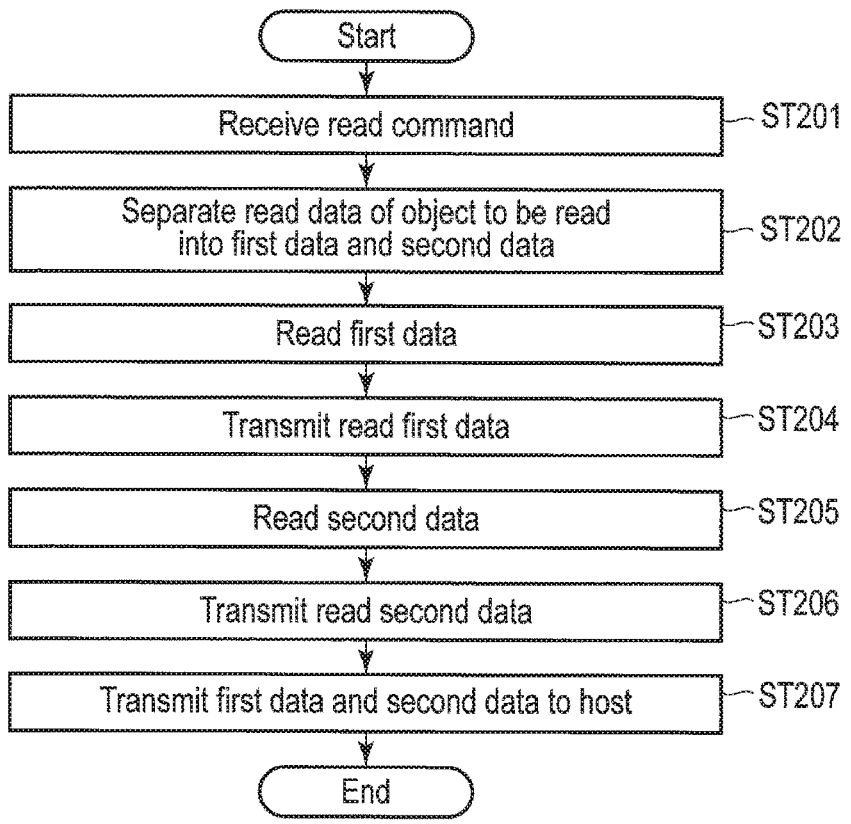
FIG. 4 is a flowchart showing an example of a read operation of the magnetic disk device according to the embodiment.

Next, a read operation of the magnetic disk device 1 will be described below. FIG. 4 is a flowchart showing an example of a read operation of the magnetic disk device.

As shown in FIG. 4, when the magnetic disk device 1 receives a read command from the host 4 (ST201), the MPU 132 separates the read data which is an object to be read into the first data and second data (ST202). More specifically, the MPU 132 separates the read data which is the object to be read into the first data to be read from the disk 30 by using the head 61, and second data other than the first data and to be read from the disk 30 by using the head 62, and transmits information about a separation result to the buffer control section 110. Then, the disk control section 130 of the system controller 100A reads the first data from the disk 30 (ST203). The read first data is transmitted to the buffer 3 (ST204).

Next, an instruction to read the second data is output to the disk control section 130 through the data communication circuit 120, communication path C, and data communication circuit 120 of the system controller 100B, and hence the disk control section 130 of the system controller 100B reads the second data from the disk 30 (ST205). The read second data is transmitted to the buffer 3 through the data communication circuit 120, communication path C, data communication circuit 120 of the system controller 100A, and buffer control section 110 (ST206).

The read data transmitted to the buffer 3 and constituted of the first data and second data is transmitted to the host 4 from the magnetic disk device 1 (ST207), and the processing is terminated. In this way, the read processing is executed in the magnetic disk device 1.

According to the magnetic disk device 1 configured in the manner described above, each of the system controllers 100A and 100B having the identical configuration can control the actuator, and hence it is possible to reduce the cost of development of the system controller of the magnetic disk device provided with two actuators.

Further, it is possible to change the operation mode of the system controller by changing the setting of the mode setting section 140, and hence it is possible to easily change the operation mode of the system controller. In this embodiment, the operation mode can be changed by only changing the state of the external terminal between 0 and 1, and hence it becomes easy for the operator to change the operation mode. It should be noted that changing the state of the external terminal between 0 and 1 implies, for example, setting a protruding object (pin) exposed to the outside to the on-position.

Next, a case where the system controller of this embodiment is applied to a magnetic disk device including a single actuator will be described below. FIG. 5 is a view showing an example of setting of the third operation mode.

As shown in FIG. 5, in the system controller 100C, the third operation mode setting section 143 is set to ON, and first and second operation mode setting sections 141 and 142 are respectively set to OFF. The third operation mode is set in this manner, and hence, whereas the buffer control section 110 and disk control section 130 are enabled to communicate with each other through the communication path 104, the function of the data communication circuit 120 is disabled.

As described above, by setting the operation mode to the system controller, it becomes possible to further apply the system controller which can be used as both a main control device and sub-control device of the magnetic disk device 1 including a dual actuator to a magnetic disk device including a single actuator, and thereby achieve further cost reduction of the system controller.

It should be noted that in the embodiment described above, as the dual actuator, although a case where the two actuators are respectively driven with respect to different axes has been described, the example of the dual actuator is not limited to this. For example, a configuration in which drive of two actuators is controlled with respect to one axis may also be employed. More specifically, as shown in FIG. 6, an actuator provided with a head 61, and actuator provided with a head 63 may be provided on one axis, and drive of the two actuators may respectively be controlled by means of VCMs 51 and 53.

Furthermore, in the embodiment described above, as the magnetic disk device provided with a plurality of actuators, although a case of the dual actuator has been described, the example of the magnetic disk device is not limited to this. As a plurality of actuators, three or more actuators may be provided. In this case, it is sufficient if three system controllers are provided, and each system controller is configured to be able to set the operation mode in which each actuator is to be controlled.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic disk device comprising:
a magnetic disk;
a first actuator configured to execute write/read of first data on/from the magnetic disk;

a second actuator configured to execute write/read of second data on/from the magnetic disk;

a first controller includes a first communication circuit and a first buffer and configured to control the first actuator; and a second controller includes a second communication circuit and a second buffer and configured to control the second actuator, wherein the first controller is configured to receive the data from outside by the first buffer and configured to be able to communicate with the second controller through the first communication circuit and the second communication circuit.

2. The magnetic disk device of claim 1, wherein the data from outside is write data, and the first controller writes first data of the write data on the magnetic disk by means of the first actuator, the first controller transmits second data of the write data other than the first data to the second controller through the first communication circuit and the second communication circuit, and the second controller writes the second data on the magnetic disk by means of the second actuator.

3. The magnetic disk device of claim 2, wherein upon receipt, from a host, of an instruction to read data, the first controller reads first data of read data which is an object to be read from the magnetic disk by means of the first actuator, the second controller reads second data of the read data other than the first data from the magnetic disk device by means of the second actuator, the second controller transmits the second data to the first controller through the second communication circuit and the first communication circuit, and the first controller transmits the first data and the second data to the host.

4. The magnetic disk device of claim 1, wherein the first controller and the second controller respectively include a first setting section configured to set operating in a first operation mode, and a second setting section configured to set operating in a second operation mode, the first operation mode is an operation mode in which control to write the first data of the write data of the first actuator and the second actuator is to be executed, and the second operation mode is an operation mode in which control to write the second data of the write data other than the first data of the first actuator and the second actuator is to be executed.

5. The magnetic disk device of claim 4, wherein when operating in the second operation mode according to the setting of the second setting section, each of the first controller and the second controller disables a function unnecessary for an operation in the second operation mode.

6. The magnetic disk device of claim 5, wherein each of the first controller and the second controller includes a third setting section configured to set operating in a third operation mode in which read/write of data from/on the magnetic disk is executed by means of one actuator.

7. The magnetic disk device of claim 6, wherein the first setting section, the second setting section, and the third setting section are set by an input section provided in each of the first controller and the second controller.

8. The magnetic disk device of claim 7, wherein the input section is an external terminal of each of the first controller and the second controller.

9. The magnetic disk device of claim 1, wherein the first controller and the second controller are the same model number.

10. A data processing method of the magnetic disk device of claim 1, wherein writing first data of write data received from outside on the magnetic disk by means of the first actuator, transmitting second data of the write data other than the first data from the first controller to the second controller, and writing the second data on the magnetic disk by means of the second actuator.

11. The data processing method of the magnetic disk device of claim 10, wherein upon receipt, from a host, of an instruction to read data, reading first data of read data which is an object to be read from the magnetic disk by means of the first actuator, reading second data of the read data other than the first data from the magnetic disk device by means of the second actuator, transmitting the second data from the second controller to the first controller, and transmitting the first data and the second data to the host.

* * * * *